United States Patent [19]

Weiland

[11] 4,195,967
[45] Apr. 1, 1980

[54] ROTOR FREE OF FLAPPING HINGES AND FREE OF LEAD-LAG HINGES

[75] Inventor: Emil Weiland, Hohenbrunn, Fed. Rep. of Germany

[73] Assignee: Messerschmitt-Boelkow-Blohm GmbH, Munich, Fed. Rep. of Germany

[21] Appl. No.: 844,317

[22] Filed: Oct. 21, 1977

[30] Foreign Application Priority Data

Oct. 26, 1976 [DE] Fed. Rep. of Germany ....... 2648343

[51] Int. Cl.$^2$ ............................................. B64C 27/48
[52] U.S. Cl. ................................ 416/134 A; 416/138
[58] Field of Search ............... 416/134 A, 141, 230 A, 416/138 A, 241 A

[56] References Cited

U.S. PATENT DOCUMENTS

| 3,384,185 | 5/1968 | Fernandez | 416/141 X |
|---|---|---|---|
| 3,549,444 | 12/1970 | Katz | 156/175 |
| 3,669,566 | 6/1972 | Bourquardez et al. | 416/230 A X |
| 3,824,037 | 7/1974 | Mautz et al. | 416/134 A X |
| 3,941,503 | 3/1976 | Bruel | 416/138 A X |
| 3,967,918 | 7/1976 | Mouille et al. | 416/241 A X |
| 4,012,169 | 3/1977 | Mouille et al. | 416/134 A |

FOREIGN PATENT DOCUMENTS

1190259  4/1970  United Kingdom ...................... 416/135

*Primary Examiner*—Everette A. Powell, Jr.
*Attorney, Agent, or Firm*—W. G. Fasse; D. F. Gould

[57] ABSTRACT

The present rotor for rotary wing aircraft is of the type which is free of flapping hinges as well as free of lead-lag hinges. Such rotor shall have a simple structure and a small structural weight while simultaneously having a high operational reliability. To this end the rotor hub comprises upper and lower support or carrier plates made of a fiber compound material arranged in such a manner that the fibers extend substantially radially. The upper and lower support plates are spaced from each other by thrust arms or lands and the blade angle bearings are supported between the carrier plates of a fiber compound material.

15 Claims, 8 Drawing Figures

ROTOR FREE OF FLAPPING HINGES AND FREE OF LEAD-LAG HINGES

BACKGROUND OF THE INVENTION

The present invention relates to a rotor for rotary wing aircrafts. The rotor is of the type which is free of flapping hinges as well as free of lead-lag hinges. The rotor blades are each connected to a carrier bar which is resistant against bending. The carrier bar in turn is rotatably supported on a substantially rigid rotor hub by means of blade angle bearings located radially inwardly and radially outwardly relative to the carrier bar. Connection elements which are of high tensional strength are arranged between the carrier bars to provide a compensation of the centrifugal forces.

Prior art rotors of this type as for example disclosed in German Pat. No. 1,531,355 have carrier bars respectively supported in sleeve like rotor arms of the rotor hub or of the rotor head in a rotatable manner by means of bearing positions located radially outwardly and radially inwardly. In such a structure the rotor hub is relieved of the centrifugal forces by means of connection elements constructed as segments rigid against tension but elastic relative to torsion loads. However, the remaining thrust load, shearing load, and bending moment loads are substantial and it is necessary to use high strength metallic materials for the rotor hub which not only cause an undesirably high structural weight of the rotor system, but which are also expensive and hard to work.

OBJECTS OF THE INVENTION

In view of the foregoing, it is the aim of the invention to achieve the following objects singly or in combination:

- to construct a rotary wing aircraft rotor which is simple in its structure, inexpensive as well as low in its structural weight while simultaneously exhibiting a high operational reliability;
- to provide a rotor of the type described, which requires very little maintenance because it is relatively insensitive against damages and which provides a substantially fail safe structure;
- to provide a rotor structure which takes full advantage of the superior, specific characteristics of fiber compound materials so that the rotor hub will have a high strength relative to the effective dynamic bending loads in the flapping direction of the rotor blades;
- to construct the rotor hub in such a manner that it has a high structural strength in a circumferential direction, that is in the direction in which the lead-lag and drive moments are effective;
- to arrange the fibers in the upper and lower support plates in such a manner that the fibers extend tangentially relative to a central opening, whereby the fibers do not extend exactly radially and thus are capable to function substantially in the manner of the spokes in a bicycle wheel;
- to manufacture the upper and lower support plates by winding the fiber compound material for both plates in unison onto a core having a shape corresponding to the inner contour of the hub, whereby the winding method corresponds to that of winding a field coil, the so-called pole winding method;
- to construct the upper and lower support plates in such a manner that they taper conically toward the outer edge thereof, whereby this is preferably accomplished by a fiber winding density which diminishes toward the outer edge;
- to combine various directions of the extensions of the fibers in the fiber compound material in order to accomplish a most advantageous load take-up and force distribution; and
- to combine fiber materials which have different elasticity coefficients whereby the rotor will have a fail safe characteristic.

SUMMARY OF THE INVENTION

According to the invention there is provided a rotor for rotary wing aircraft which rotor is of the type free of flapping hinges as well as free of lead-lag hinges. The rotor comprises upper and lower carrier plates made of a fiber compound material, wherein the fibers extend substantially radially relative to the rotational axis of the rotor. The support plates are spaced from each other by shear resistant arms or lands and the blade angle bearings are supported between the support plates made of fiber compound material.

Due to the special design of the rotor hub as well as due to manufacturing the rotor hub of fiber compound materials, it is possible to take into account the anisotropic stiffness and strength characteristics of such fiber compound materials, thus, the present rotor provides a light weight structure which exhibits high strength characteristics even relative to dynamic loads and which at the same time is simple to manufacture at relatively low costs. The simple and inexpensive manufacture applies to the entire structural unit comprising the rotor hub proper and all related components. In addition, the rotor according to the invention comprises a high operational reliability combined with low maintenance requirements. Besides, the present rotor is not sensitive to damages and provides in a simple manner a substantially fail safe structure.

A further advantageous embodiment of the invention is accomplished by thrust arms or shear resistant lands extending substantially radially and also constructed of compound fiber materials, wherein the fibers extend in cross-over directions, thus, the present rotor hub utilizes the superior specific characteristics of fiber compound materials to exhibit a high strength relative to the effective dynamic bending loads in the flapping direction of the rotor blades. Preferably and suitably the thrust arms or lands are constructed as box shaped wound bodies extending coaxially to the carrier bars between the upper and lower support plates. This type of structure greatly facilitates its manufacture.

Further, the upper and lower support plates are preferably of circular shape. The circumferential edges of these circular plates are interconnected with each other intermediate the carrier bars by means of lands extending in the circumferential direction and made of fiber compound materials. Such circumferential lands of fiber compound materials further improve the bending strength of the hub in the flapping direction of the rotor blades. In addition, they provide a high strength in the circumferential direction, that is in the direction in which the lead-lag and drive moments are effective. To facilitate the manufacture and also for reasons of structural strength, the circumferential lands are constructed as an integral part of the upper and lower support plates which part merges into these plates at the circumference thereof.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
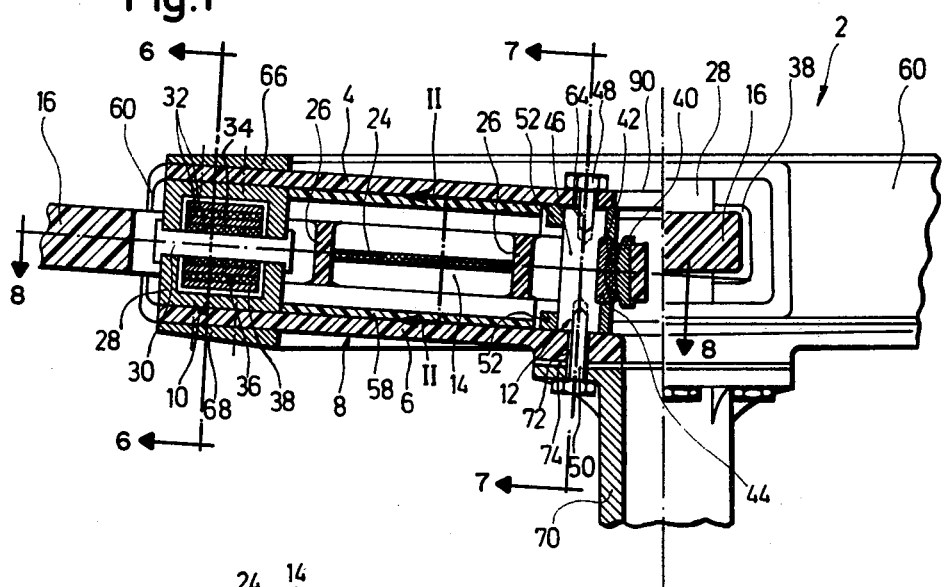
FIG. 1 illustrates a side view, partially in section, of a rotor according to the invention shown in a somewhat schematic manner.
Figure 2:
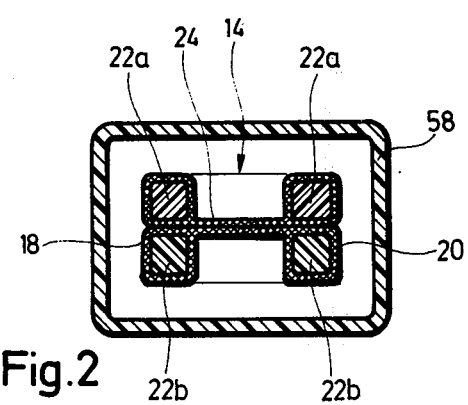
FIG. 2 is a sectional view through the box shaped wound body and the carrier bar of the rotor according to FIG. 1, whereby the section extends along the limited section line II—II in FIG. 1.

FIG. 1 shows a four blade rotor 2 comprising an upper support plate 4 and a lower support plate 6 forming part of the rotor hub 8. Carrier bars 14 which are resistant against tension and bending loads are rotatably secured in the rotor hub by means of respective blade angle bearings 10 and 12 arranged radially inwardly and radially outwardly relative to said plates 4 and 6. The carrier bars 14 extend inwardly to a point near the rotational axis of the rotor. The outer end of the carrier bars 14 merges integrally into the blade root 16 of the rotor blade. The rotor blade comprises a neck section which is flexible in the blade flapping direction as well as in the lead-lag direction of the rotor blade. Further, the blade root 16 is resistant against torsion loads. The rotor blade further comprises the wing section proper extending between the blade neck and the tip of the wing. Instead of the integral construction of the rotor wing and the carrier bar, it is possible to construct the carrier bar 14 and the blade root 16 as separate components and to connect these components conventionally to each other by means of a blade connection bolt and the respective hardware.

Figure 6:
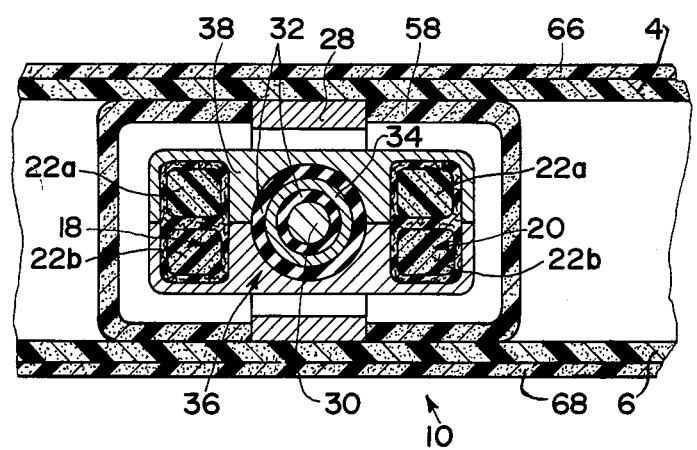
FIG. 6 is a schematic sectional view of the outer blade angle bearing along section line 6—6 in FIG. 1.
Figure 7:
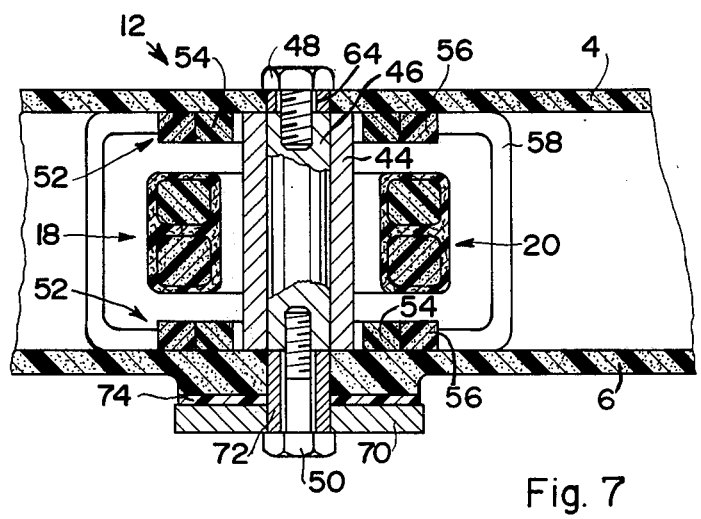
FIG. 7 is a schematic sectional view of the inner blade angle bearing along the section line 7—7 in FIG. 1.
Figure 8:
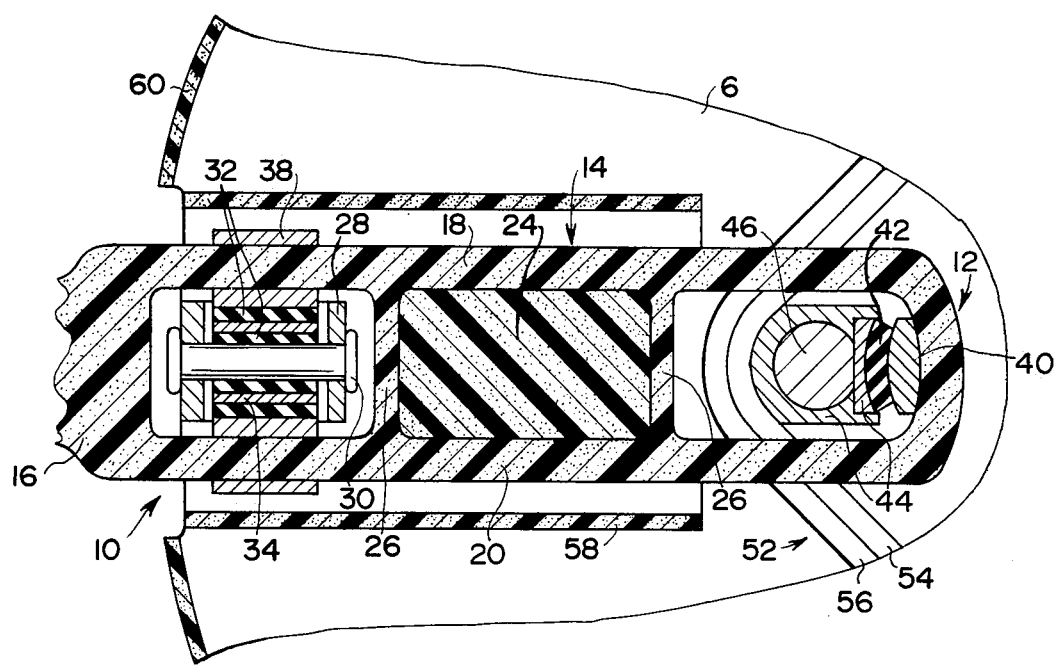
FIG. 8 is a sectional view through the present rotor structure along section line 8—8 in FIG. 1.

As seen from FIGS. 2, 6, 7 and 8, each carrier bar 14 is constructed in the manner of a bending resistant load beam made of fiber compound materials. Each carrier bar 14 comprises reinforced belt sections 18 and 20 each comprising two fiber compound material strands 22a and 22b. The fibers of these strands extend uniformly in the same direction in the longitudinal extension of the carrier bar. The strands 22a and 22b are interconnected in a loop shape at the radially inward end of the carrier bar. In the embodiment comprising two separate components forming the carrier bar 14 and the blade root 16, the strands 22a and 22b are also looped around the bushings which receive the bolt interconnecting the carrier bar and the blade root. As shown particularly in FIGS. 2 and 8, the two belt sections 18 and 20 are spaced from each other by shear resistant web means 24 comprising a fiber compound webbing wherein the fibers are arranged to cross each other in directions extending at ±45° relative to each other. The web means 24 extend into the fiber compound strands 22a, 22b and surround these fiber compound strands. The web means or members 24 comprise a window shaped opening in the area of the blade angle bearing 10 and 12. Adjacent to the margin the member 24 is reinforced by means of intermediate lands 26 which interconnect the belt sections 18 and 20 with each other. As shown in FIGS. 1, 6 and 8, the outer blade angle bearing 10 is an elastomeric bearing and comprises a bearing housing 28 which is screwed to the upper support plate 4 and to the lower support plate 6. The bearing housing 28 supports a bearing pin 30 on two sides and simultaneously constitutes a post type interconnection between the upper and lower support plates 4 and 6. The bearing pin 30 forms the blade angle bearing axis. Further, the bearing pin 30 carries a bearing ring 36 constructed of elastomeric layers 32 and metal layers 34 arranged alternately one on top of the other. The bearing ring 36 is supported in a bearing shell 38 screwed to the belt section 18 and 20 of the carrier bar 14. A so-called steering horn, not shown, is secured to the bearing shell 38 for steering or controlling the blade angle. Due to the elastomeric layers 32 the blade angle bearing 10 constitutes a bearing point capable of angular excursions and permitting the axial movement of the carrier bar 14, thus, the blade angle bearing 10 operates as an axially loose bearing. Further, by respectively selecting and arranging the elastomeric layers 32 and the metal layers 34, a damping action may be accomplished, especially for the blade vibration in the flapping direction which is damped merely somewhat in an aerodynamic sense.

As shown in FIGS. 1, 7 and 8, the inner blade angle bearing 12 combines a radial bearing with an axial bearing comprising a matching element 40 arranged on the inner belt loop of the carrier bar 14. The matching element 40 transmits the cross-wise effective forces as well as the centrifugal forces to a form member 44 by means of a bearing element 42. The form member 44 is secured between the upper support plate 4 and the lower support plate 6 by means of a spacer bolt 46 and by screw means 48 and 50. The spacer bolt 46 simultaneously constitutes a post connection between the upper and the lower support plates 4 and 6.

Figure 3:
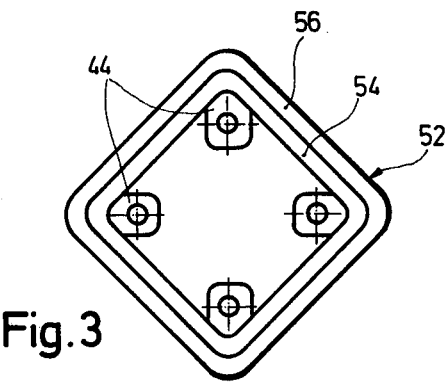
FIG. 3 is a top plan view of the loop element according to FIG. 1 which is used for compensation of centrifugal forces.

Loop elements 52 interconnect all form members 44 with each other and compensate for centrifugal forces. Thus, the loop elements 52 provide a direct compensation for the centrifugal forces of all rotor blades, thereby avoiding or preventing any loading of the hub by such centrifugal forces. As best seen in FIG. 3, the loop elements 52 are subject to tension loads only and are manufactured of fiber compound material by the so-called thread winding method. Each loop element 52 comprises two fiber strands which have substantially different elasticity coefficients, but are of about the same structural strength. Thus, the inner fiber strand 54 is made, for example, of glass fiber synthetic material, whereas the outer fiber strand 56 is made of carbon fiber synthetic material. The two loop strands 54 and 56 are dimensioned so that each of these strands is capable alone to fully take up the total centrifugal force.

The upper support plate 4 and the lower support plate 6 are further connected with each other, in addition to the bearing housing 28 and the spacer bolt 46, by means of radially extending thrust struts in the form of box shaped, wound bodies 58 of fiber compound material. The fibers of the wound body 58 extend in crossover fashion relative to each other. The wound bodies 58 surround the carrier bars 14 in a coaxial manner and are bonded by adhesive means to the upper and lower support plates 4 and 6 intermediate the outer and inner blade angle bearings 10 and 12. Thus, the wound bodies 58 stiffen the upper and lower support plates 4 and 6 in a shear resistant manner. In addition, the upper and lower support plates 4 and 6 are connected to each other at their outer edges by means of bow shaped bridging members 60 extending in the circumferential direction. The bridging members 60 are provided with openings in the area of the bearing housing 28 of the outer blade angle bearing 10. Further, the bridging members 60 are integrally merged or shaped into the upper support plate 4 and the lower support plate 6.

The upper and lower support plates 4 and 6 are also manufactured of a fiber compound material, wherein the fibers extend substantially in the radial direction. During the manufacture of these plates, bushings are inserted during the winding operation to take up the screw means. Thus, for example, the bushings 62 are provided for securing the plates to the bearing housing 28 of the outer blade angle bearing 10. The bushings 64 are provided for the screw means 48 including the spacer bolts 46. The upper and lower plates 4 and 6 are reinforced in the area of the bushings where the forces are introduced. For this purpose, fiber compound laminates, the fibers of which extend in many directions, are placed in the force introducing areas. Such laminates may, for example, be webbings arranged in several layers on the outer or inner side of the plates 4, 6. As shown, for example, in FIGS. 1 and 6, the laminate layer 66 reinforces the upper support plate 4 and the laminate layer 68 reinforces the lower support plate 6. These laminate layers 66 and 68 extend around the outer edges of the upper and lower support plates.

The lower support plate 6 is secured to the rotor mast 70 by the lower screw means 50. The respective buushing 72 is laminated into the lower support plate 6. Further, the bushing 72 reaches all the way into the flange of the rotor mast 70 and is constructed as a shearing bushing. An intermediate layer 74 is located between the lower plate 6 and the rotor mast 70. The intermediate layer 74 is coated with a lubricant to eliminated friction, whereby the torsion moment transmitted from the rotor mast 70 to the rotor hub 8 is limited by the bushing 72 to a predetermined maximum value for safety reasons. Further spacer members may be inserted between the upper and lower plates 4 and 6 in the area of the inner plate edge. Such spacer elements would be provided in addition to the spacer bolt 46. These additional spacer members are connected to the upper and lower support plates 4 and 6 in the same manner as has been described above with reference to the screw means 48 and 50 as shown in FIG. 4 by the bushings 76 which would receive such screw means for the additional spacer members.

Figure 5:
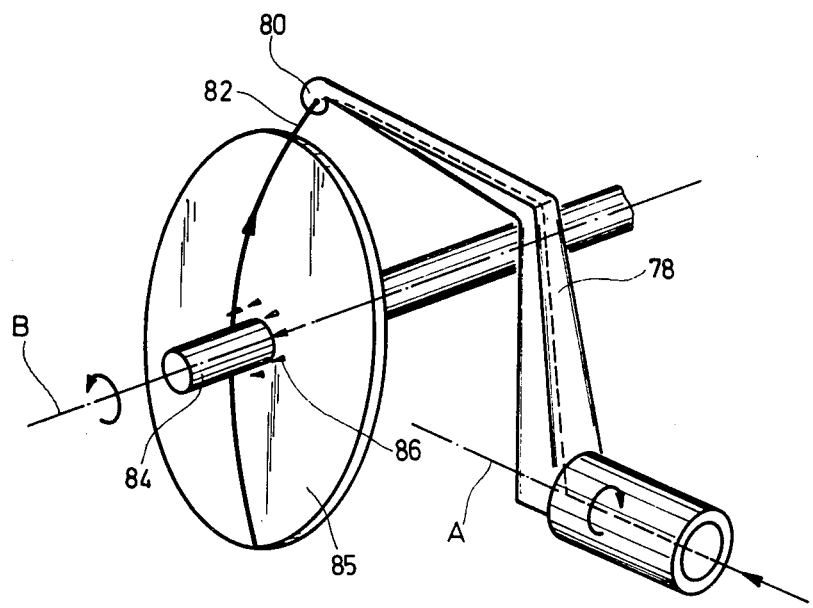
FIG. 5 is a schematic, perspective illustration of a field coil or polar winding apparatus for producing the hub plate.

The circular upper and lower support plates 4 and 6 which taper toward their outer edge and the bridging members 60 which interconnect at these plates are manufactured on a pole winding apparatus as illustrated in FIG. 5. Such a pole winding apparatus comprises a winding arm 78 rotatable about a rotational axis A. The integral outer free end of the arm 78 has a thread eye 80 through which the fiber thread 82 extends. The apparatus further includes a winding mandrel 84 rotatable about the rotational axis B. A winding core 85 is secured to the mandrel 84 to rotate with the mandrel. The core 85 has an outer contour corresponding to the inner contour of the rotor hub 8. Thread guide or deflector pins 86 are inserted in those positions where the bushings are to be integrated into the structure of the plates 4 and 6. During the winding operation the rotation of the thread eye 80 and of the winding mandrel 84 are coordinated relative to each other to achieve the desired guiding of the thread 82, whereby the screw receiving bushings 62, 64, 72, and 76 are simultaneously integrated into the wound structure of the plates 4 and 6. The deflection or guiding of the thread 82 around the bushings is accomplished by the thread guides 86 inserted into the bushings and having a core shaped configuration. An especially economical production is possible if the box shaped winding bodies 58 are premanufactured in a separate step and then are integrated into the winding mandrel. Subsequent to laminating the premanufactured laminate layers 66, 68, and possibly further webbing layers having multi-directional threadings in the area of the screw bushings 64, 72 and 76, the rotor hub 8 is cured in a single step procedure. The winding core 85 which correponds in its shape to the inner contour of the rotor hub, may remain as a lost core during the curing. The winding core 85, may, for example, be made of a foam material. Thereafter, the outer web 60 which connects the upper and lower plates 4 and 6 at their outer edges, is removed in the area of the bearing housing 28, for example, by milling. If desired, the strut 60 may be completely removed on a lathe in a turning operation, whereby the separated core may then be removed.

Figure 4:
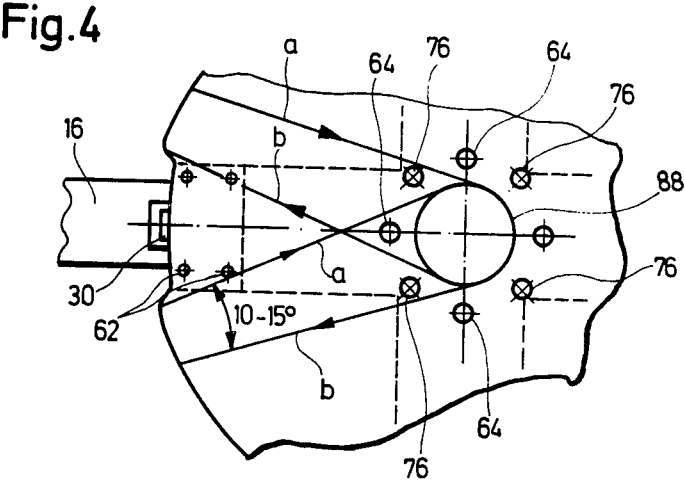
FIG. 4 is a partial top plan view of the upper hub plate.

As illustrated in FIG. 4, the direction of the threads is selected so that the fibers extend substantially radially inwardly from the outer plate edge and tangentially relative to the central opening 88 in the plates which opening is formed by the winding mandrel 84. Thus, the fibers a and b partially loop around the opening 88 to return back to the outer edge, thereby forming an opening angle of 10° to 15° as indicated in FIG. 4, said angle extending between the fiber or threads a and b.

Due to this guiding of the fibers or threads a thickening is accomplished centrally around the opening 88 which is desired for the present purposes because the thickening strengthens the plate or disc in the area where the bushings 64, 72 and 76 are located. Simultaneously the disc tapers toward its circumferential edge. The central opening 88 provides access to the inner blade angle bearing 12 for inspecting and mounting purposes or for disassemblying the rotor system. A cover 90 secured to the upper plate 4 closes the opening 88 and thus the rotor system in the upward direction as shown in FIG. 1.

As illustrated further in FIG. 1, the inner surfaces of the upper and lower plates 4 and 6 may have a flat conical disposition in such a manner that the axes of the blade angle bearings 10 and 12 and of the carrier bars 14 extend at a fixed cone angle relative to the rotational plane of the rotor. This arrangement has the advantage that the static component of the bending moment resulting and from the flapping motion of the rotor blade during normal or rated operation of the rotor is compensated by a counter moment of equal size resulting from the centrifugal force effect.

Due to the above described arrangement of the fibers or threads a, b as shown in FIG. 4, the fibers cross each other in the plates 4 and 6 and the effect is somewhat comparable to that of the spokes in a bicycle wheel, whereby the torque moment driving the rotor causes a tension loading of the fibers which is desirable.

With reference to FIG. 5 it will be appreciated that the upper and lower plate 4 and 5 may be wound simultaneously by simultaneously winding the fibers onto the inner core 85 having an outer contour corresponding to the inner contour of the hub.

The described disc shape of the plates which tapers radially outwardly is desirable because such a shape takes into account the loads to which the rotor structure is exposed in operation. In addition this feature of the invention has the advantage that the conical shape is automatically accomplished when the plates are manufactured according to the so-called pole winding method because this type of winding makes sure that the fiber density diminishes toward the outer circumferential edge of the disc shaped plates 4 and 6. Another advantage of the flat conical shape of the plates is seen in that by adapting the shape of the plates during the plate manufacture, as described, it is possible to compensate the static bending moment component resulting from the flapping, bending oscillations of the rotor blade, by a counter moment caused by the centrifugal force. For this purpose the upper plate and the lower plate have such a conical shape that the axes of the blade angle bearings and of the carrier bars extend upwardly relative to the rotational plane of the rotor at such a cone angle that the static bending moment components are compensated.

As mentioned, the inner blade angle bearing which is secured between the upper and lower plates 4 and 6 is preferably constructed as a bearing effective in the radial and in the axial direction in order to make possible a construction of the connecting elements of fiber compound materials while simultaneously assuring their torsion rigidity. The inner blade angle bearing 12 is secured to a tensional resistant connecting element at the bearing portion facing the hub proper. To assure a simple manufacture of these connecting elements they are suitably made in this instance as loops of fiber compound material which loop around the bearing components adjacent to the hub.

In order to assure a still further use of fiber compound materials in the manufacture of the present rotor assembly including the rotor hub and respective structural components, the carrier bars 14 are suitably constructed as bending resistant beams. The fibers of the fiber compound materials forming these beams extend uniformly in the same direction in the area of the reinforced belt sections. The fibers are shaped to form loops at the points where forces are introduced into these beams. The bending strength of the carrier bars may be further increased by spacing the belt sections, preferably by means of intermediate struts, wherein the fibers extend all in the same direction and by means of shear resistant areas or elements in which the fibers extend in crossover fashion. In this context it is preferable, to further simplify the manufacture by making the rotor blades and the respective carrier bar as an integral structural component. This is even facilitated by the fact that the rotor blades normally are made of fiber compound materials anyway.

Another advantage of the invention is achieved in that at least some of the fiber compound structural components are preferably made of fiber compound materials, including two different fiber types. This applies especially to the connecting elements which must be resistant against tension. The two different fiber materials have different elasticity coefficients but substantially the same material strength, and each fiber proportion is selected so that it alone is capable to take up the loads to which the fiber component structural element is exposed. Thus, this type of double layer construction assures that first the fiber proportion with the higher elasticity factor takes up the loads effective on the structural component. This fiber layer may, for example, be of the carbon fiber type. Only when the fiber layer having the higher elasticity coefficient fails, for example, when the fiber carbon layer breaks, will the other fiber proportion or layer having the lower elasticity coefficient, become effective since it was not subject to any load prior to such breaking of the carbon fiber layer. The second fiber layer may, for example, be made of glass fibers. In this manner the invention assures that the rotor structure has a fail safe characteristic.

Although the invention has been described with reference to specific example embodiments, it will be appreciated, that it is intended to cover all modifications and equivalents within the scope of the appended claims.

What is claimed is:

1. A rotor free of flapping hinges and free of lead-lag hinges for rotary wing aircraft, comprising rotor blades, carrier bar means operatively interconnecting said rotor blades, substantially rigid rotor hub means and radially outer blade angle bearing means (10) as well as radially inner blade angle bearing means (12) operatively connecting said carrier bar means to said substantially rigid rotor hub means, tension resistant connecting means operatively arranged between the carrier bar means for compensating centrifugal forces effective on the carrier bar means, said substantially rigid rotor hub means comprising upper disc shaped support plate means (4) and lower disc shaped support plate means (6) made of fiber compound materials wherein the fibers extend substantially radially relative to the rotational axis of the rotor, and shear resistant strut means (46, 58, 60) arranged to operatively space said upper and lower disc shaped support plate means (4, 6) from each other, said radially outer and inner blade angle bearing means (10, 12) being supported between said disc shaped support plate means (4,6).

2. The rotor of claim 1, wherein said strut means comprise strut members made of compound fiber material, the fibers of which extend in cross-over fashion, said strut members extending substantially radially relative to the rotational rotor axis.

3. The rotor of claim 2, wherein said strut members comprise box shaped, wound bodies extending coaxially relative to said carrier bar means, said box shaped, wound bodies being bonded in position between the upper and lower support plate means.

4. The rotor of claim 1, wherein said strut means comprise lands (60) extending circumferentially and made of fiber compound materials, said upper and lower support plate means having a circular shape, said lands being operatively connected to said support plate means at the outer edge thereof, whereby the support plate means are interconnected.

5. The rotor of claim 4, wherein said lands and said support plate means constitute an integral structure whereby the lands merge into the outer edge of the upper and lower support plate means.

6. The rotor of claim 1, wherein said upper and lower support plate means comprise a central opening, and wherein the fibers of said fiber compound material extend substantially tangentially relative to said central opening.

7. The rotor of claim 1, wherein said upper and lower support plate means are made simultaneously by winding the fiber material onto a core having the shape of the inner hub contour, said winding being performed by the so-called pole winding method.

8. The rotor of claim 1, wherein said upper and lower support plate means (4, 6) having said disc shape, have a thickness which tapers radially toward the outer edge of each disc shape.

9. The rotor of claim 8, wherein said upper and lower support plate means taper in such a manner that the axes of said blade angle bearing means and of said carrier bar means extend upwardly at the cone angle relative to the rotational plane of the rotor, which cone angle is necessary for compensating the static bending moment components.

10. The rotor of claim 1, wherein said blade angle bearing means comprise a radially inwardly located blade angle bearing secured between the upper and lower support plate means, said blade angle bearing being constructed as a radially and axially effective bearing comprising a thrust bearing member (44) and a connecting element (52) operatively secured to said bearing member.

11. The rotor of claim 10, wherein said connecting element is tension resistant and comprises loop means of fiber compound materials looping around said bearing member (44).

12. The rotor of claim 1, wherein said carrier bar means are made of fiber compound material to form a bending resistant beam having reinforced sections and loop sections, said fibers extending uniformly in the same direction in the areas of said reinforced sections, said fibers looping in said loop sections to form force introduction points.

13. The rotor of claim 12, further comprising spacer means and shear resistant means cooperating to space said reinforced sections from each other, said fibers extending uniformly in the same direction in said spacer means, said fibers extending in cross-over fashion in said shear resistant means.

14. The rotor of claim 1, wherein one carrier bar and one rotor blade are constructed as an integral structural component.

15. The rotor of claim 1, wherein fiber compound material of which at least certain of said means are made, comprise two fiber components of fiber material, each component having a different fiber elasticity coefficient and substantially the same material strength, each fiber component being so dimensioned as to be able to take up alone the effective loads.

* * * * *